(12) United States Patent
Moriwaki et al.

(10) Patent No.: US 8,198,074 B2
(45) Date of Patent: Jun. 12, 2012

(54) REACTION DEVICE

(75) Inventors: Toshiki Moriwaki, Kanagawa (JP); Akira Yumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 302 days.

(21) Appl. No.: 12/146,089

(22) Filed: Jun. 25, 2008

(65) Prior Publication Data
US 2009/0004729 A1 Jan. 1, 2009

(30) Foreign Application Priority Data
Jun. 28, 2007 (JP) ................. P2007-171262

(51) Int. Cl.
*C12M 1/34* (2006.01)
*C12M 3/00* (2006.01)

(52) U.S. Cl. ............... 435/287.2; 435/286.1; 435/288.7; 219/209

(58) Field of Classification Search ............... 435/286.1, 435/287.2, 288.7; 219/209
See application file for complete search history.

(56) References Cited

U.S. PATENT DOCUMENTS

| | | | |
|---|---|---|---|
| 5,965,452 A * | 10/1999 | Kovacs | ............... 436/149 |
| 6,504,226 B1 | 1/2003 | Bryant | |
| 6,864,140 B2 | 3/2005 | Bryant | |
| 2001/0041347 A1 * | 11/2001 | Sammak et al. | ............. 435/7.23 |
| 2002/0055146 A1 * | 5/2002 | Shivashankar et al. | ...... 435/69.1 |
| 2003/0116552 A1 | 6/2003 | Santoruvo et al. | |
| 2003/0119289 A1 | 6/2003 | Bryant | |
| 2004/0080882 A1 * | 4/2004 | Miyazawa | ...................... 361/56 |
| 2005/0009070 A1 * | 1/2005 | Arciniegas et al. | ............... 435/6 |
| 2007/0284360 A1 | 12/2007 | Santoruvo et al. | |

FOREIGN PATENT DOCUMENTS

| | | |
|---|---|---|
| JP | 2003298068 | 10/2003 |
| JP | 2004025426 | 1/2004 |
| WO | 2007/034437 | 3/2007 |

* cited by examiner

*Primary Examiner* — William H Beisner
*Assistant Examiner* — Michael Hobbs
(74) *Attorney, Agent, or Firm* — K&L Gates LLP

(57) ABSTRACT

A reaction device including: a plurality of reaction areas; and a plurality of heating parts configured to be each provided for a respective one of the reaction areas, wherein each of the heating parts includes: a heat source; a scan line for selecting the heating part; a data line that transmits heating amount information used for heating to the heat source; a writer that acquires the heating amount information transmitted from the data line; a holder that stores the heating amount information also after the scan line is turned to a non-selected state; and a heat generation controller that controls heat generation of the heat source based on the heating amount information.

4 Claims, 15 Drawing Sheets

REACTION DEVICE

CROSS REFERENCES TO RELATED APPLICATIONS

The present application claims priority to Japanese Patent Application JP 2007-171262 filed with the Japan Patent Office on Jun. 28, 2007, the entire contents of which is being incorporated herein by reference.

BACKGROUND

The present application relates to reaction devices. More specifically, the application relates to a reaction device that can carry out temperature control with high accuracy.

If there is a need to control a reaction based on a temperature condition, it is desired that the temperature condition can be controlled with higher accuracy. Furthermore, it is desired that temperature control can be carried out with high accuracy in a reaction device in which a reaction is performed irrespective of which of liquid, solid, and gas is the reaction target. Such a demand arises also in e.g. the technical field of gene analysis.

One example of the gene analysis technique requiring the high-accuracy temperature control is analysis by use of a polymerase chain reaction (PCR) method, in which gene amplification is performed. The PCR method could be a standard method for quantitative analysis of a trace of nucleic acid.

In the PCR method, the amplification cycle of "thermal denaturation→annealing of primers→polymerase extension reaction" is continuously repeated. This can amplify DNA and so on by a factor of hundreds of thousands. The quantitative analysis of a trace of nucleic acid can also be performed by monitoring the thus obtained PCR-amplified product in real time.

In the PCR method, however, it is necessary that the amplification cycle be controlled accurately. To accurately control the amplification cycle, high-accuracy temperature control is required. Insufficient temperature control leads to a problem that irrelevant DNA sequences are amplified or amplification is not found at all.

Therefore, it is important that the above-described device can carry out thermal control with high accuracy as a reaction device. As techniques relating to this respect, techniques for temperature control of the reaction device are disclosed in Japanese Patent Laid-Open No. 2003-298068 and Japanese Patent Laid-Open No. 2004-025426. In addition, a technique of using semiconductor elements and so on for control of heat generation of a small area is also proposed.

SUMMARY

However, even the technique of carrying out temperature control by use of semiconductor elements and so on in the related-art reaction device involves the following problems.

Specifically, the semiconductor element involves manufacturing variation in general. Therefore, even when the same temperature control is carried out for the respective reaction areas, the heating amount varies from substrate to substrate, and from heating part to heating part even on the same substrate. This results in difficulty in high-accuracy temperature control as a reaction device.

In addition, characteristics of the semiconductor element change depending on the temperature in general. For example, a MOS transistor based on single-crystal silicon has a negative temperature characteristic. Thus, even when the same voltage is applied thereto, a higher temperature leads to a smaller amount of the current flowing therethrough. Consequently, even when the same voltage is applied, the heating amount varies depending on the temperature, which results in difficulty in high-accuracy temperature control.

There is a need to provide a reaction device that can carry out temperature control with high accuracy.

The present application is not merely directed to the use of semiconductor elements or the like for a thermal control system but focused on the circuit arrangement and so on of the thermal control system. More specifically, the present application is directed to incorporating an active-matrix structure capable of controlling the respective heat units into the thermal control system.

According to an embodiment, there is provided a reaction device including a plurality of reaction areas, and a plurality of heating parts configured to be each provided for a respective one of the reaction areas. Each of the heating parts includes a heat source, a scan line for selecting the heating part, and a data line that transmits heating amount information used for heating to the heat source. Each of the heating parts further includes a writer that acquires the heating amount information transmitted from the data line, a holder that stores the heating amount information also after the scan line is turned to the non-selected state, and a heat generation controller that controls heat generation of the heat source based on the heating amount information.

By providing the heating part for each of the reaction areas of the reaction device, heating control can be carried out individually. Heating only at the timing when the scan line is selected is not performed, but the heating amount information for the respective heating parts (heat units) that are desired to generate heat can be held after the heating amount information is written and until the next heating amount information is written. As a result, the time during which the heating is performed is not limited to the selection period of the scan line, which is a short time. Thus, easy and stable heating operation is achieved.

In the reaction device, the heating amount information transmitted from the data line may be a signal current, and the heating part may include a converter that converts the signal current to a voltage level. Furthermore, the holder may hold the heating amount information as the voltage level, and the heat generation controller may convert the held voltage level to a current level to thereby control heat generation.

By converting the form of the heating amount information from the signal current to the voltage level, the signal current can be temporally stored as the voltage level in the holder. By converting the voltage level to the current level, high-accuracy heating control can be carried out.

In the reaction device, the converter may include a first field effect transistor whose gate and drain are electrically connected to each other. The holder may include a capacitor that holds the voltage between the gate and source of the first field effect transistor, generated due to the flow of the signal current through the first field effect transistor. The heat generation controller may include a second field effect transistor through which a current dependent upon the voltage between the gate and source of the first field effect transistor flows.

Using the first field effect transistor allows generation of the voltage dependent upon the applied signal current. The voltage between the gate and source of the first field effect transistor can be held by the capacitor.

In the reaction device, the first field effect transistor and the second field effect transistor may be identical transistors. In addition, conversion operation of converting the signal current to the voltage level by the converter and control operation of controlling heat generation of the heat source based on the heating amount information by the heat generation controller may be carried out in a time-sharing manner.

By alternately carrying out the conversion operation and the control operation in a time-sharing manner, more accurate heating amount information can be transmitted to the heat generation control system of the heat generation controller. As a result, the heating amount can be controlled with higher accuracy.

In the reaction device, the converter may include the first field effect transistor and a third field effect transistor whose gate and drain are electrically connected to each other, and the source of the first field effect transistor and the drain of the third field effect transistor may be electrically connected to each other.

The provision of the third field effect transistor can further enhance the degree of matching between the drive current and the signal current. As a result, more accurate heating amount information can be transmitted to the heat source, which allows heating control with higher accuracy.

The reaction device may further include a unit configured to stop a drive current during the period from acquisition of the heating amount information by the writer to acquisition of the next heating amount information.

The reaction device may be a PCR device that performs a gene amplification reaction in the reaction areas.

By using the reaction device as a PCR device, temperature control of the heating cycle of the gene amplification reaction can be carried out for each reaction area individually with high accuracy. As a result, the amplification factors of the samples loaded in the respective reaction areas can be uniformed to a constant magnification factor. Consequently, individual and high-accuracy temperature control can be carried out for each reaction area, which allows exhaustive analysis with high accuracy.

The reaction device used as the PCR device may further include an optical unit configured to irradiate the reaction areas with excitation light having a predetermined wavelength, and a fluorescence detector configured to detect fluorescence generated due to irradiation of the excitation light.

By further providing the PCR device with the optical unit and the fluorescence detector, the gene amplification reaction can be analyzed in real time.

Additional features and advantages are described herein, and will be apparent from the following Detailed Description and the figures.

DETAILED DESCRIPTION

Reaction devices according to a preferred embodiment of the present application will be described below based on the accompanying drawings. It should be noted that the embodiment shown in the accompanying drawings is merely one example of representative embodiments of the present application and the scope of the present application shall not be interpreted as being limited by the embodiment.

Figure 1:
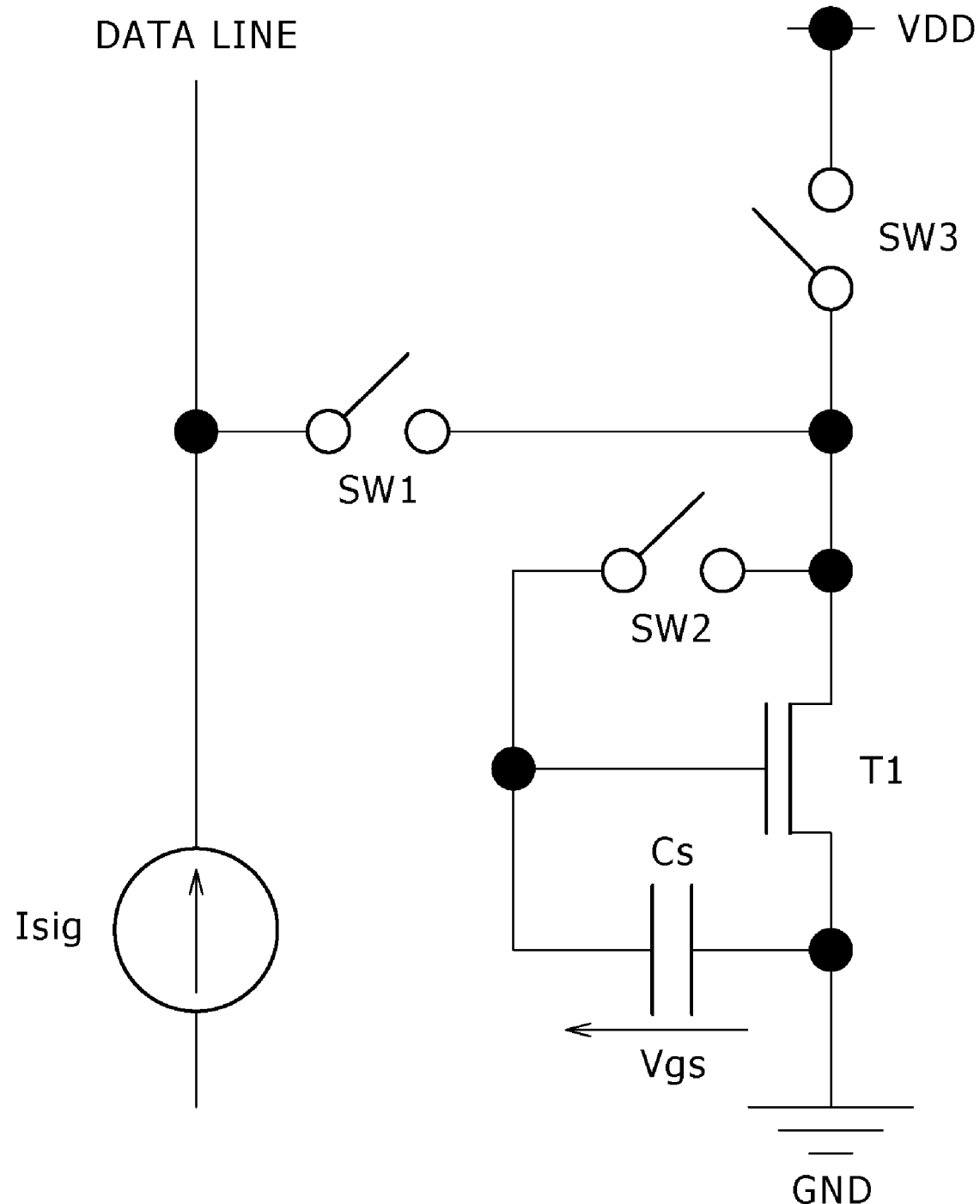
FIG. 1 is a circuit diagram showing the circuit arrangement of a heating part included in a reaction device according to one embodiment of the present application.
Figure 2:
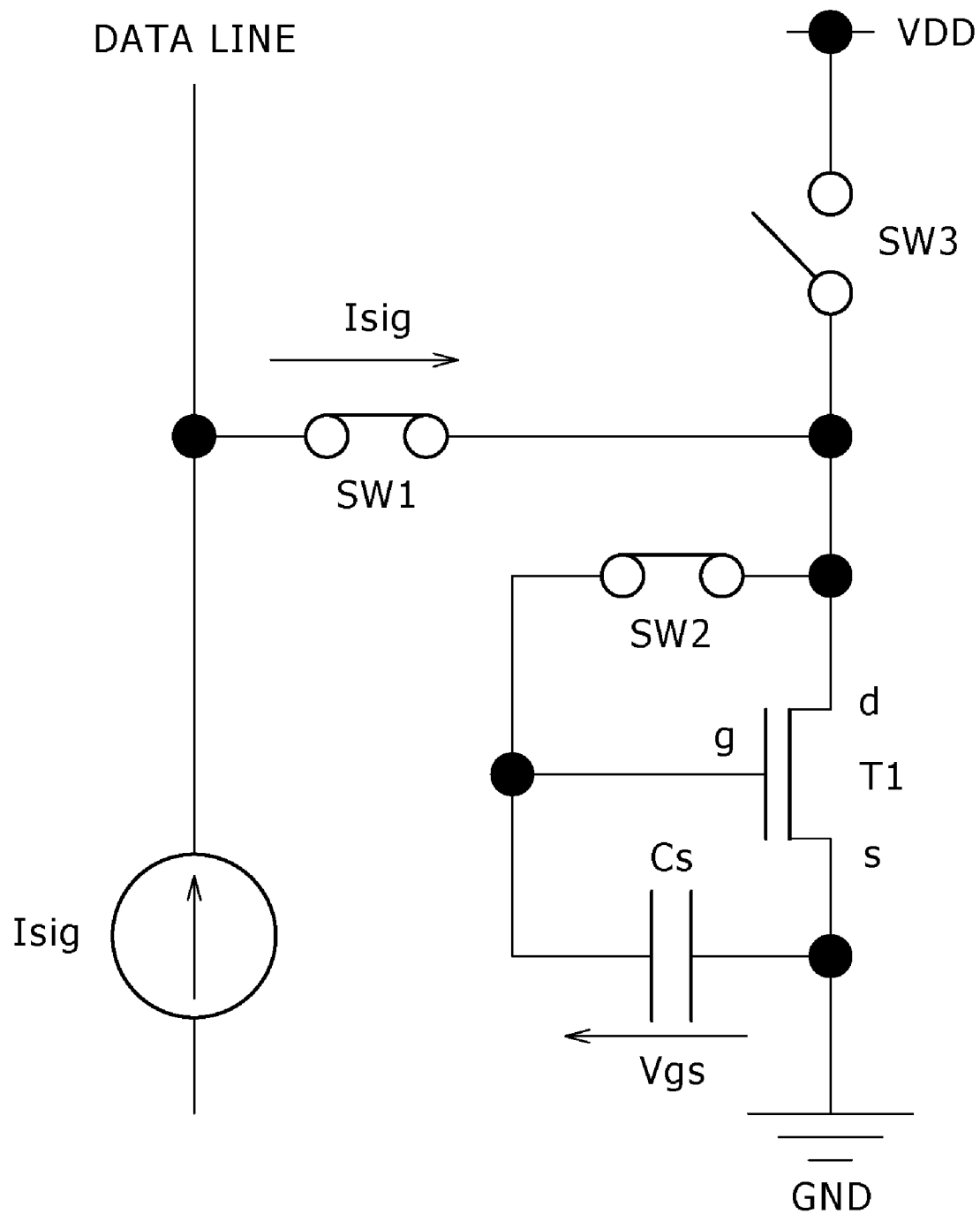
FIG. 2 is a circuit diagram showing one state of the circuit operation of the circuit of FIG. 1.
Figure 3:
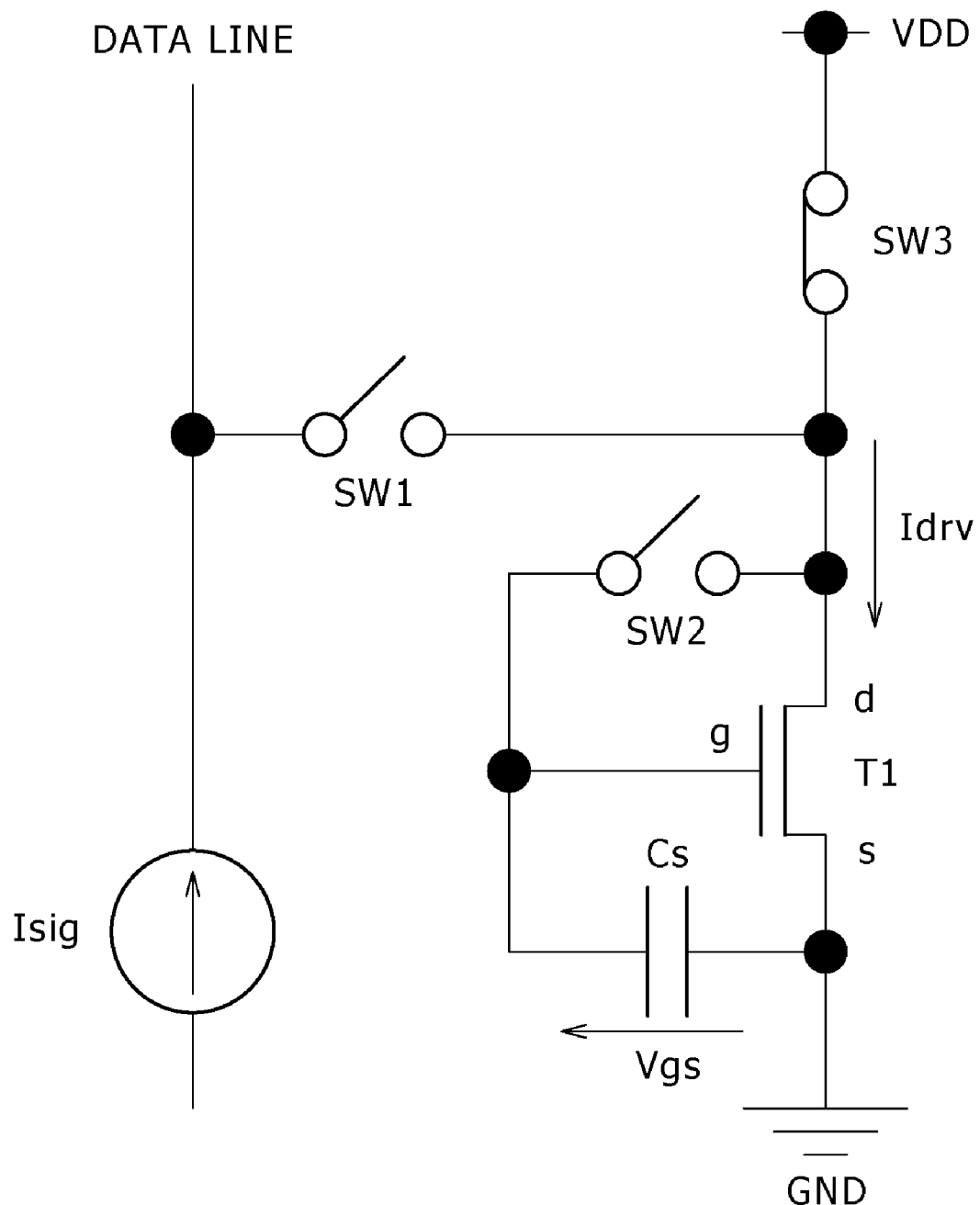
FIG. 3 is a circuit diagram showing another state of the circuit operation of the circuit of FIG. 1.

FIG. 1 is a circuit diagram showing the circuit arrangement of a heating part included in a reaction device according to one embodiment. FIG. 2 is a circuit diagram showing one state of the circuit operation of the circuit of FIG. 1. FIG. 3 is a circuit diagram showing another state of the circuit operation of the circuit of FIG. 1.

A transistor T1 in FIG. 1 is an N-channel insulated gate field effect transistor (hereinafter, it will be often referred to simply as a transistor). Symbol SW denotes a switch. Symbols g, d, and s denote gate, drain, and source, respectively. Symbol Cs denotes a capacitor.

A drive current flows via the transistor T1 between a supply potential VDD and a ground potential GND. The Joule heat generated due to the resistor components of the transistor T1 and a switch SW3 can be used as the heat source. The use of an N-channel transistor as the transistor T1 is one example, and a P-channel transistor can also be used optionally in the embodiment.

In an embodiment, heating amount information to be transmitted from a data line is a signal current. It is desirable for the circuit of the embodiment to have a circuit arrangement for converting this signal current to a signal voltage to thereby carry out thermal control. The operation of the circuit of FIG. 1 will be described below with reference to FIGS. 2 and 3.

FIG. 2 shows operation of writing heating amount information in the form of a current level (i.e. signal current) to the heating-part circuit. In this write operation, switches SW1 and SW2 are in the on-state and the switch SW3 is in the off-state.

The drain d and gate g of the transistor T1 are short-circuited with each other by the switch SW2, and a signal current Isig flows through the transistor T1 (see FIG. 2). As a result, a signal voltage Vgs between the gate and the source, dependent upon the value of the signal current Isig, is generated.

If the transistor T1 is an enhancement-type transistor (i.e., it has a threshold voltage Vth higher than zero), it operates in its saturation region, and thus the signal current Isig and the signal voltage Vgs have the relationship represented by the following well-known Equation (1).

$$I_{sig} = \mu \cdot C_{ox} \cdot \frac{W}{L} \cdot \frac{(V_{gs} - V_{th})^2}{2} \quad (1)$$

In Equation (1), μ denotes the carrier mobility, Cox denotes the gate capacitance per unit area, W denotes the channel width, and L denotes the channel length.

If the switch SW2 is turned off at the timing when the circuit is stabilized, the gate-source voltage Vgs is held in the capacitor Cs. Thus, the signal write operation is completed by turning off the switch SW1.

Thereafter, when the switch SW3 is turned on as shown in FIG. 3 at any timing, a current flows from the supply voltage VDD toward the ground potential GND. If the supply voltage VDD is set sufficiently high and the on-resistance of the switch SW3 is set sufficiently low so that the transistor T1 may operate in the saturation region at this time, a drive current Idrv that flows through the transistor T1 does not depend on the drain-source voltage Vds but is represented by Equation (2). This drive current Idrv corresponds with the signal current Isig.

$$I_{drv} = \mu \cdot C_{OX} \cdot \frac{W}{L} \cdot \frac{(V_{gs} - V_{th})^2}{2} \quad (2)$$

Specifically, in general, the respective parameters included in the right sides of Equations (1) and (2) vary from substrate to substrate, and from place to place even on the same substrate. However, due to the driving shown in FIGS. 2 and 3, the signal current Isig and the drive current Idrv correspond with each other irrespective of the values of these parameters.

The signal current Isig with the accurate value can be generated by e.g. a control circuit outside the heater matrix. Therefore, the Joule heat generated from the heater-unit circuit of FIG. 1 is not affected by variation in transistor characteristics and so on but can be achieved as the accurate value determined by the product of the supply voltage VDD and the signal current Isig (VDD×Isig).

Figure 4:
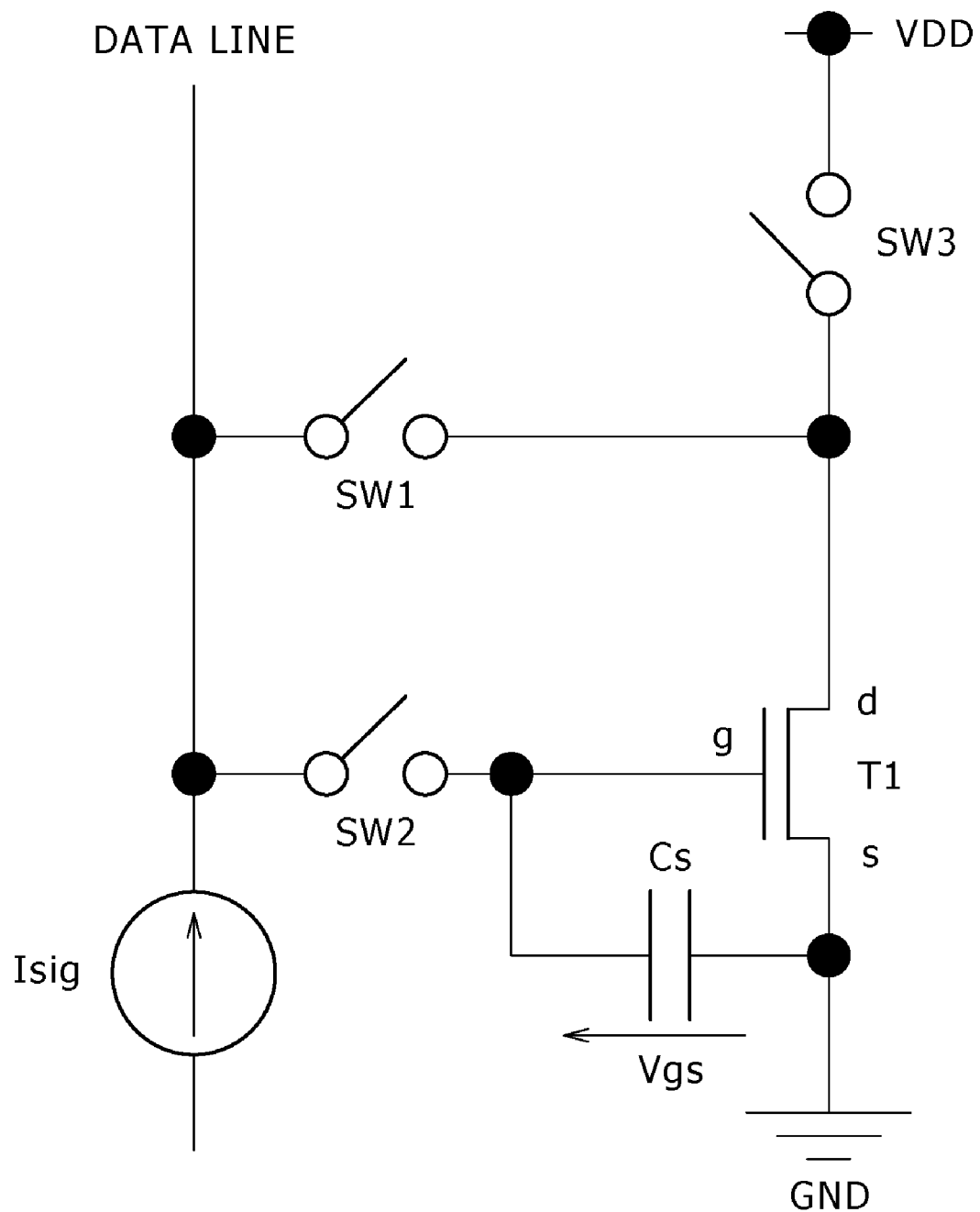
FIG. 4 is a circuit diagram showing a modification example of the circuit arrangement shown in FIG. 1.

FIG. 4 is a circuit diagram showing a modification example of the circuit arrangement shown in FIG. 1.

The circuit shown in FIG. 4 is different from that of FIG. 1 in the connection relationship of the switch and so forth. However, in the circuit shown in FIG. 4, the switches SW1 and SW2 are kept at the on-state and the switch SW3 is kept at the off-state at the time of signal writing, similarly to the circuit shown in FIG. 1. At the time of heat generating operation, the switches SW1 and SW2 are kept at the off-state and the switch SW3 is kept at the on-state. The equivalent circuits in the respective operation states of the circuit of FIG. 4 are similar to those of FIGS. 2 and 3, respectively, and thus the circuit of FIG. 4 can also exert the same function as that of the circuit of FIG. 1.

Figure 5:
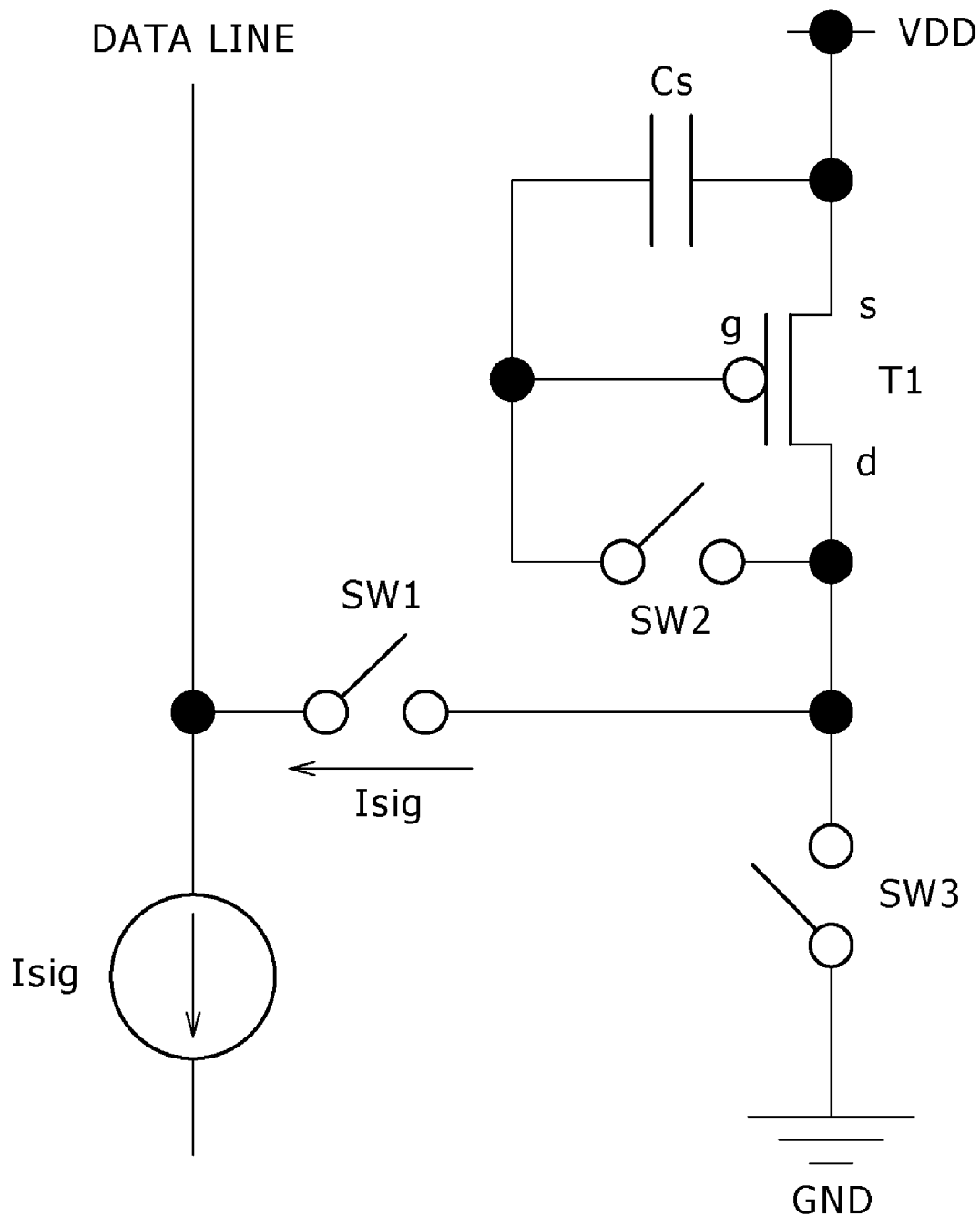
FIG. 5 is a circuit diagram showing another modification example of the circuit arrangement shown in FIG. 1.

FIG. 5 is a circuit diagram showing another modification example of the circuit arrangement shown in FIG. 1.

The circuit of FIG. 5 is different from that of FIG. 1 in that a P-channel transistor is used as the transistor T1 and the current direction is reversed. However, the principle of the circuit of FIG. 5 is the same as that of the circuit of FIG. 1 and thus the circuit of FIG. 5 can exert the same function.

In an embodiment, in the case of a low-temperature poly-silicon thin film transistor (TFT), it is preferable to use a P-type metal oxide semiconductor (PMOS). This is because the PMOS has more stable characteristics in the case of the low-temperature poly-silicon TFT.

Figure 6:
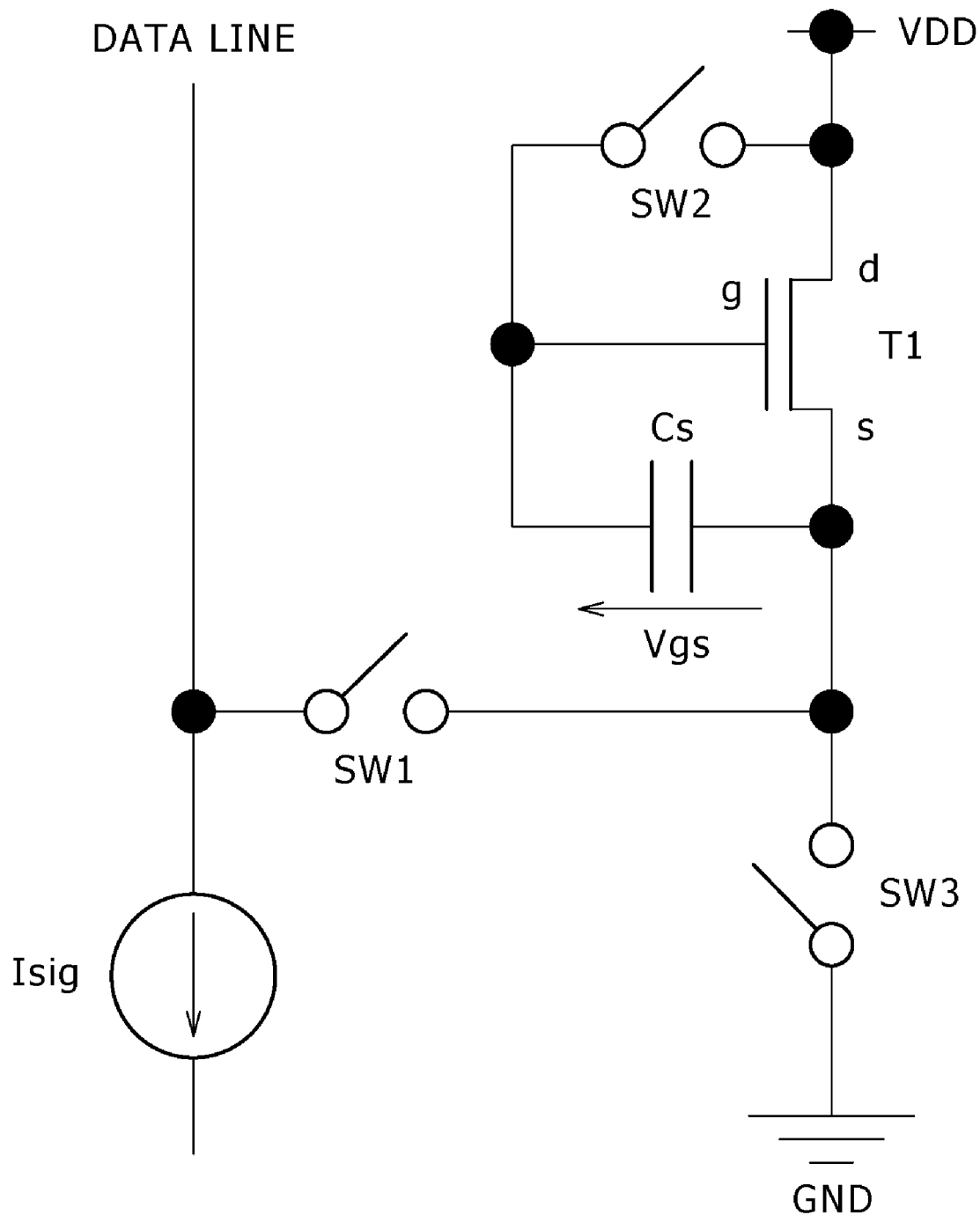
FIG. 6 is a circuit diagram showing yet another modification example of the circuit arrangement shown in FIG. 1.

FIG. 6 is a circuit diagram showing yet another modification example of the circuit arrangement shown in FIG. 1.

The way of control of the respective switches SW1, SW2, and SW3 in the circuit of FIG. 6 is the same as that in the circuit of FIG. 1. However, the circuit of FIG. 6 is different from that of FIG. 1 in that the signal current Isig is drawn out from the source of the transistor T1. However, the circuit of FIG. 6 has the operation principle that the signal current Isig is caused to flow through the transistor T1 in the state in which the gate and drain of the transistor T1 are short-circuited with each other and the gate-source voltage Vgs generated in response to the flow of the signal current Isig is held in the capacitor Cs. This operation principle is the same as that of the circuit of FIG. 1. Thus, the circuit of FIG. 6 can exert the same function as that of the circuit of FIG. 1.

In an embodiment, it is desirable that the converter include a first field effect transistor and a third field effect transistor whose gate and drain are electrically connected to each other and the source of the first field effect transistor be electrically connected to the drain of the third field effect transistor. This configuration will be described below with reference to FIG. 7 and so on.

Figure 7:
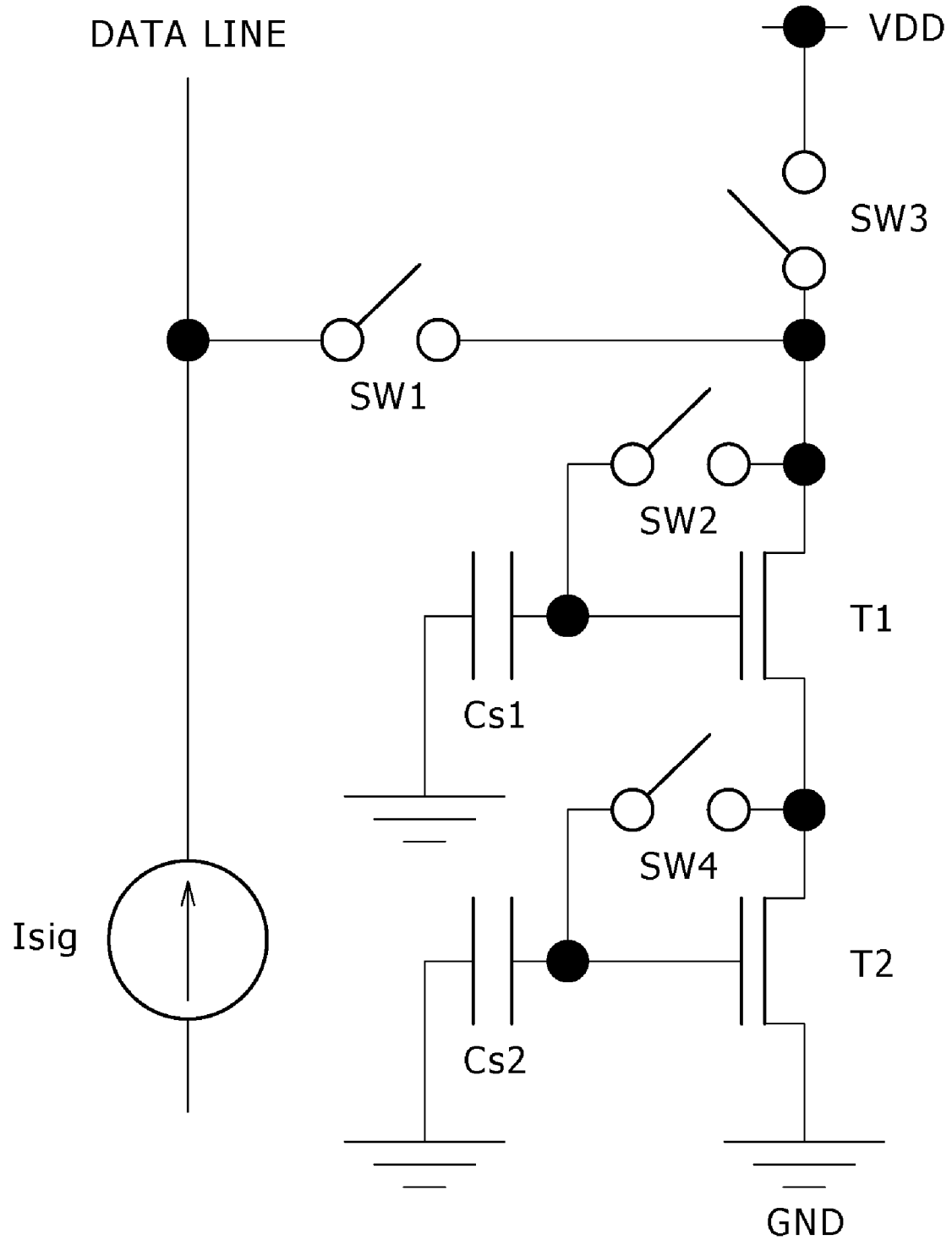
FIG. 7 is a circuit diagram showing yet another modification example of the circuit arrangement shown in FIG. 1.

FIG. 7 is a circuit diagram showing yet another modification example of the circuit arrangement shown in FIG. 1. The circuit of FIG. 7 is different from that of FIG. 1 in that the circuit of FIG. 7 arises from addition of a transistor T2, a switch SW4, and a capacitor Cs2 to the circuit arrangement of FIG. 1. The switch SW4 is controlled similarly to the switch SW2. The operation of this circuit will be described below.

As described above, in the circuit of FIG. 1, the signal current Isig is represented by Equation (1) and the drive current Idrv is represented by Equation (2), and hence the signal current Isig and the drive current Idrv correspond with each other. This feature follows e.g. the basic operation that, in the saturation-region operation of a MOS transistor, the current flowing through the MOS transistor does not depend on the drain-source voltage Vds but is determined only by the gate-source voltage Vgs.

However, in the case of an actual transistor, increase in the drain-source voltage Vds causes slight increase in the drain-source current Ids in general. This phenomenon will be attributed to e.g. the back-gate effect, in which the drain potential affects the electric conduction state of the channel, and the short-channel effect, in which the depletion layer at the drain end extends toward the source side and thus the effective channel length L becomes shorter.

A more-detailed description will be made below by taking the circuit of FIG. 1 as an example. When a comparatively-small signal current Isig is written, the gate-source voltage Vgs generated in accordance with Equation (1) is comparatively low, and the drain-source voltage Vds is a small value equal to the gate-source voltage Vgs.

On the other hand, at the time of driving, the drive current Idrv is small and hence the voltage drop across the switch SW3 is small. Thus, the drain-source voltage Vds of the transistor T1 is higher than that at the time of writing. In this manner, the drain-source voltage Vds of the transistor T1 at the time of writing does not correspond with that at the time of driving in general. Consequently, the signal current Isig and the drive current Idrv do not also correspond with each other, to be exact. This will often cause failure in achievement of a desired heating amount.

In contrast, the circuit arrangement shown in FIG. 7 can suppress this problem. The operation of the circuit of FIG. 7 will be described below. Similarly to the circuit of FIG. 1, the drain-source voltage Vds of the transistor T1 at the time of writing does not correspond with that at the time of driving in general. However, when the drain-source voltage Vds at the time of driving is high for example, although the drive current Idrv is larger than the signal current Isig, the differential resistance of the transistor T2 is very high if the transistor T2 is operating in the saturated state (in other words, it is carrying out operation close to that of a constant current source).

Thus, the source potential of the transistor T1 greatly rises up in response to slight increase in the drive current Idrv. This source potential rise decreases the gate-source voltage Vgs of the transistor T1, which acts to decrease the drive current Idrv. As a result, the drive current Idrv is not greatly increased with respect to the signal current Isig. Therefore, the degree of matching between the signal current Isig and the drive current Idrv is higher compared with the example of FIG. 1.

Figure 8:
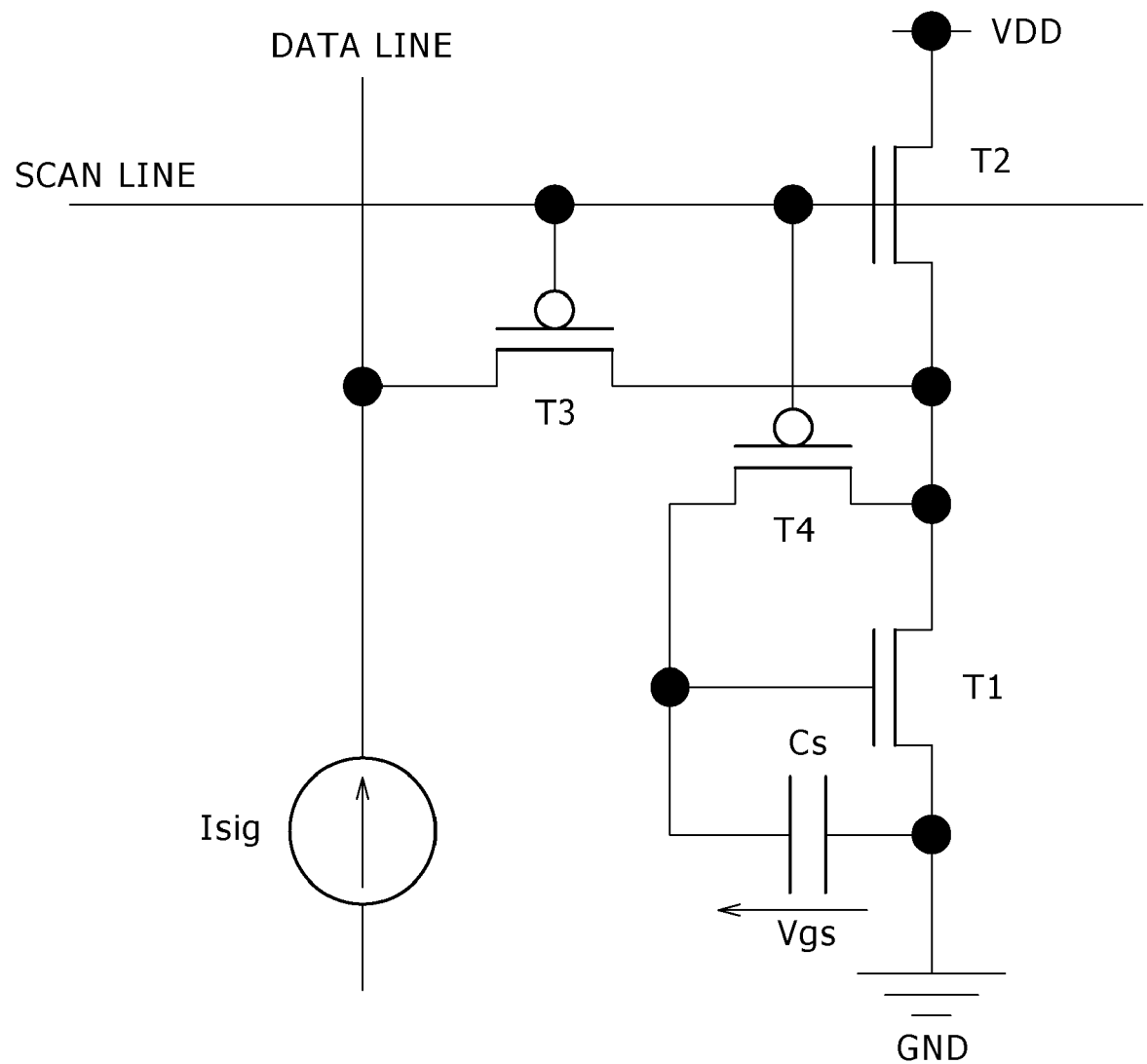
FIG. 8 is a circuit diagram showing a specific configuration example of the circuit of FIG. 1.

FIG. 8 is a circuit diagram showing a specific configuration example of the circuit of FIG. 1.

Three switches are realized by transistors T2, T3, and T4. The transistor T2 is an N-channel transistor, and the transistors T3 and T4 are each a P-channel transistor. The gates of three transistors T2, T3, and T4 are connected to a scan line in common. This allows the circuit to carry out signal write operation when this scan line is at the low level and carry out drive operation when it is at the high level. As described later, the embodiment may employ another form in which the gates of the respective transistors T2, T3, and T4 are not connected in common. However, the circuit of FIG. 8 is preferable in terms of configuration simplicity.

Figure 9:
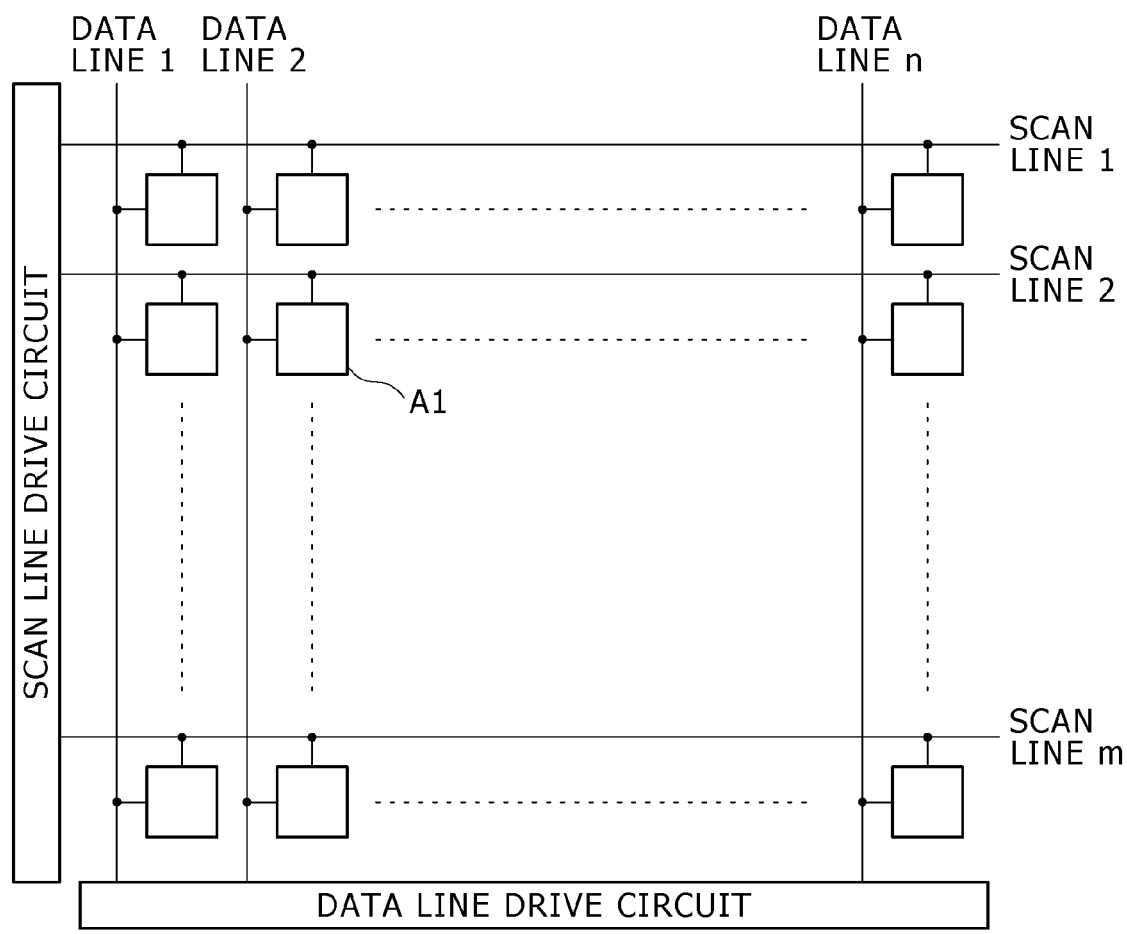
FIG. 9 is a block diagram of heating parts included in a reaction device according to one embodiment of the present application.

FIG. 9 is a block diagram of heating parts included in a reaction device according to one embodiment. Specifically, FIG. 9 shows a form in which the above-described heating parts (heater units) have a heater matrix structure. This heater matrix structure has plural scan lines 1 to m and plural data lines 1 to n. At each of the intersections A1 of these lines, e.g. the heater-part circuit shown in FIG. 8 and so on is provided.

A scan line drive circuit sequentially selects the scan lines (i.e., switch the scan lines to the low level). In synchronization with this sequential selection, a data line drive circuit applies signal currents to the respective data lines and thereby can write heating amount information to the respective heating parts on a row-by-row basis. The scan line controls the timing of acquisition of the heating amount information. After the completion of writing, the scan line is turned to the non-selected state (i.e., switched to the high level). This allows a drive current having the same current value as that of the signal current to continue to flow through the corresponding heating part (heater unit). In this way, currents each having a desired magnitude can be applied to the respective heating parts. As a result, heat of a desired amount can be generated.

Figure 10:
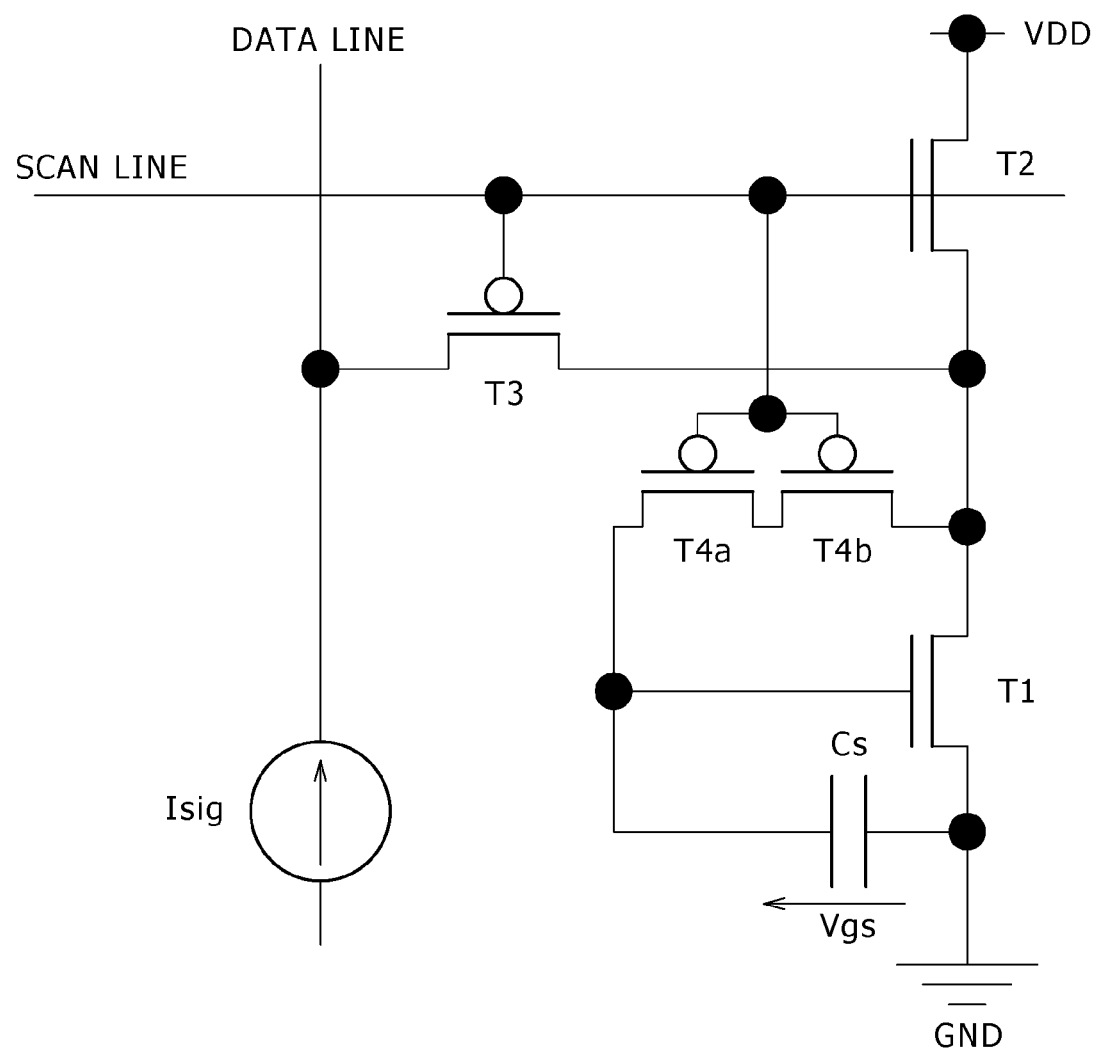
FIG. 10 is a circuit diagram showing a modification example of the circuit arrangement shown in FIG. 8.

FIG. 10 is a circuit diagram showing a modification example of the circuit arrangement of FIG. 8.

The circuit arrangement shown in FIG. 10 is different from that shown in FIG. 8 in that the circuit of FIG. 10 has transistors T4a and T4b.

In general, a defect of a TFT frequently occurs e.g. in the manufacturing process thereof. Thus, e.g. a trouble that a small leakage current flows through a switch transistor in the off-state occurs stochastically. In the circuit of FIG. 8, if a leakage current flows through the transistor T4, the voltage held in the capacitor Cs changes due to the leakage current. Consequently, the situation in which the correct heat generation state can not be maintained will often occur.

In contrast, in the circuit shown in FIG. 10, the transistor T4 used in FIG. 8 is replaced by two transistors T4a and T4b connected in series. Therefore, even if a trouble occurs in one of these transistors, a leakage current can be suppressed as a whole. Similarly, three or more transistors may be connected in series. Furthermore, the transistors T2 and T3 may each be replaced by plural transistors connected in series.

Figure 11:
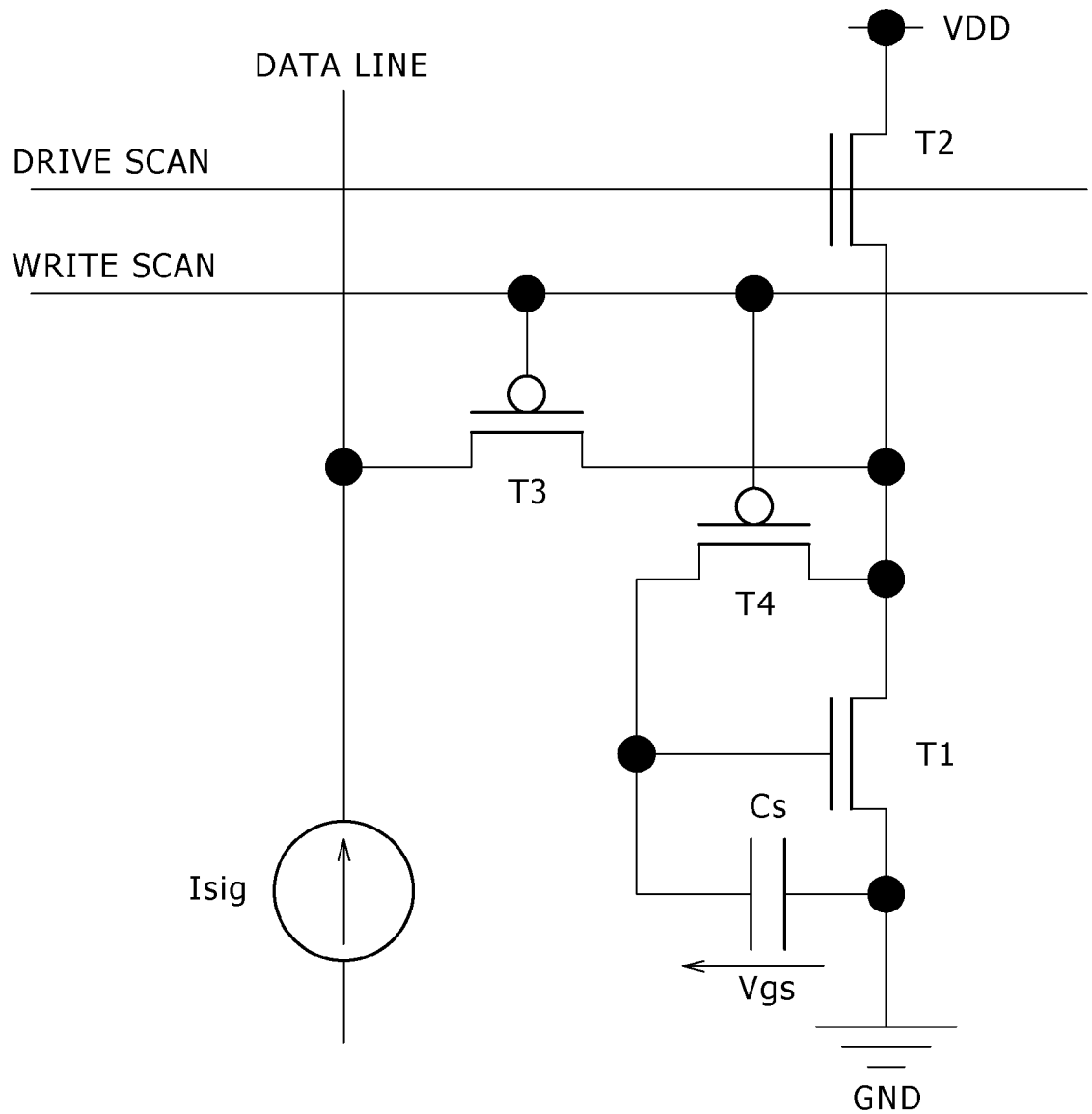
FIG. 11 is a circuit diagram showing another modification example of the circuit arrangement shown in FIG. 8.

FIG. 11 is a circuit diagram showing another modification example of the circuit arrangement of FIG. 8.

The circuit diagram of FIG. 11 shows a configuration example in which the control of the transistor T2 is carried out independently of the control of the transistors T3 and T4. At the time of signal writing, both a write scan line and a drive scan line are kept at the low level. After the writing is completed (i.e., after the write scan line is switched to the high level), the drive scan line is switched to the high level at any timing, and thereby heat generating operation can be carried out.

On the other hand, the heat generating operation can be easily stopped by switching the drive scan line to the low level. Therefore, the circuit of FIG. 11 is suitable for the case in which rapid temperature lowering is desired. Furthermore, it is also possible to adjust the time of the heat generating operation. Therefore, even if it is difficult for the signal current source to generate a small current accurately for example, accurate operation of generating slight heat can be carried out. If it is desired to avoid intermittent heating due to such operation, the cycle of heating and stop of heating is repeated plural times in the period from writing of heating amount information to writing of the next heating amount information. This allows heating that is more stable temporarily.

Figure 12:
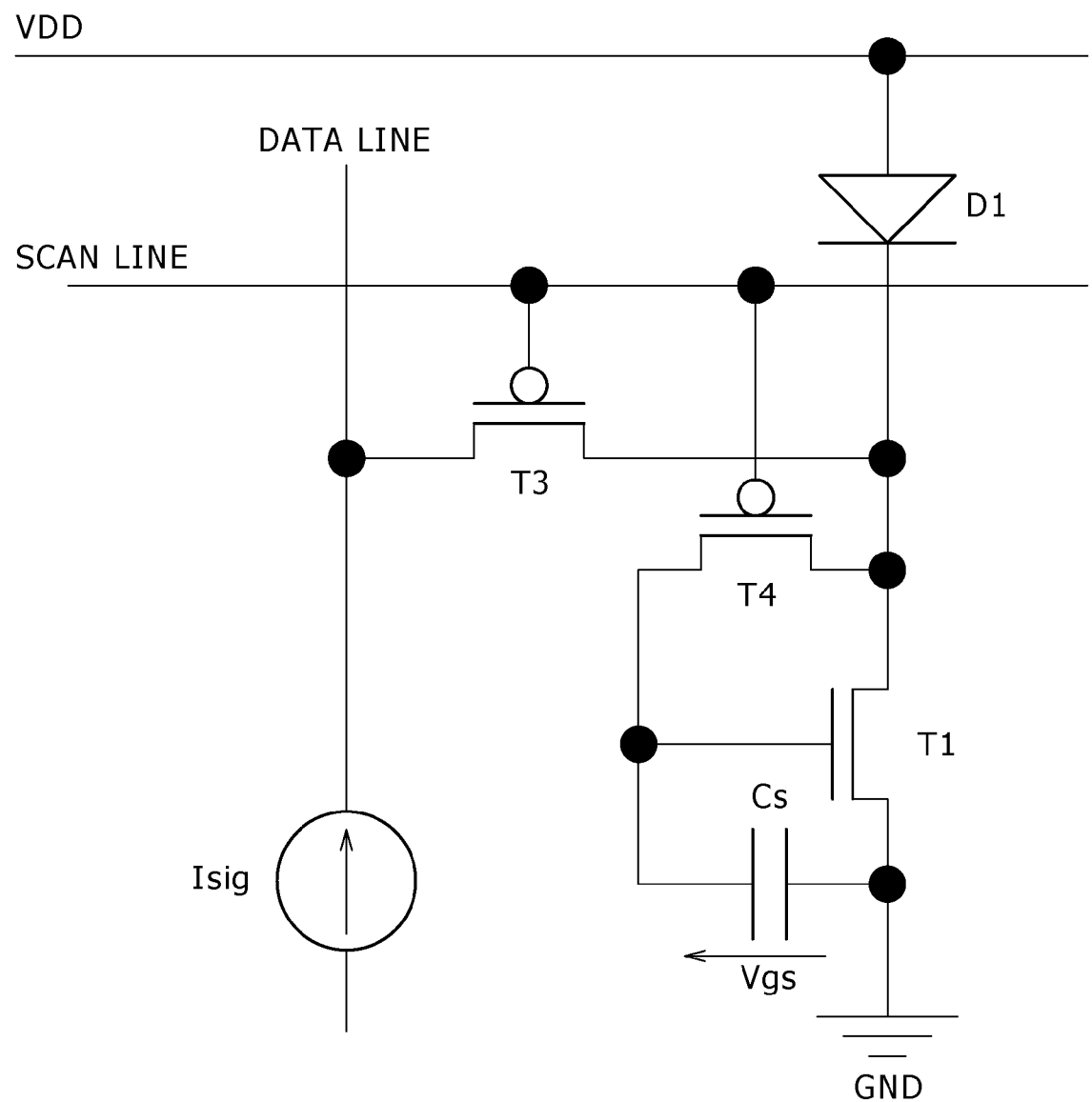
FIG. 12 is a circuit diagram showing yet another modification example of the circuit arrangement shown in FIG. 8.

FIG. 12 is a circuit diagram showing yet another modification example of the circuit arrangement of FIG. 8.

Features of the circuit of FIG. 12 are that the line of the supply voltage VDD is disposed in parallel to the scan line and the switch SW3 of FIG. 1 is formed of a diode D1. At the time of signal writing, the supply voltage VDD is kept at the low level, which keeps the diode D1 at the off-state. At the time of driving, the supply voltage VDD is kept at the high level, which keeps the diode D1 at the on-state. Thus, the diode D1 can operate as a switch. Consequently, the circuit arrangement shown in FIG. 12 can exert the same function as that of the circuit arrangement shown in FIG. 11.

Figure 13:
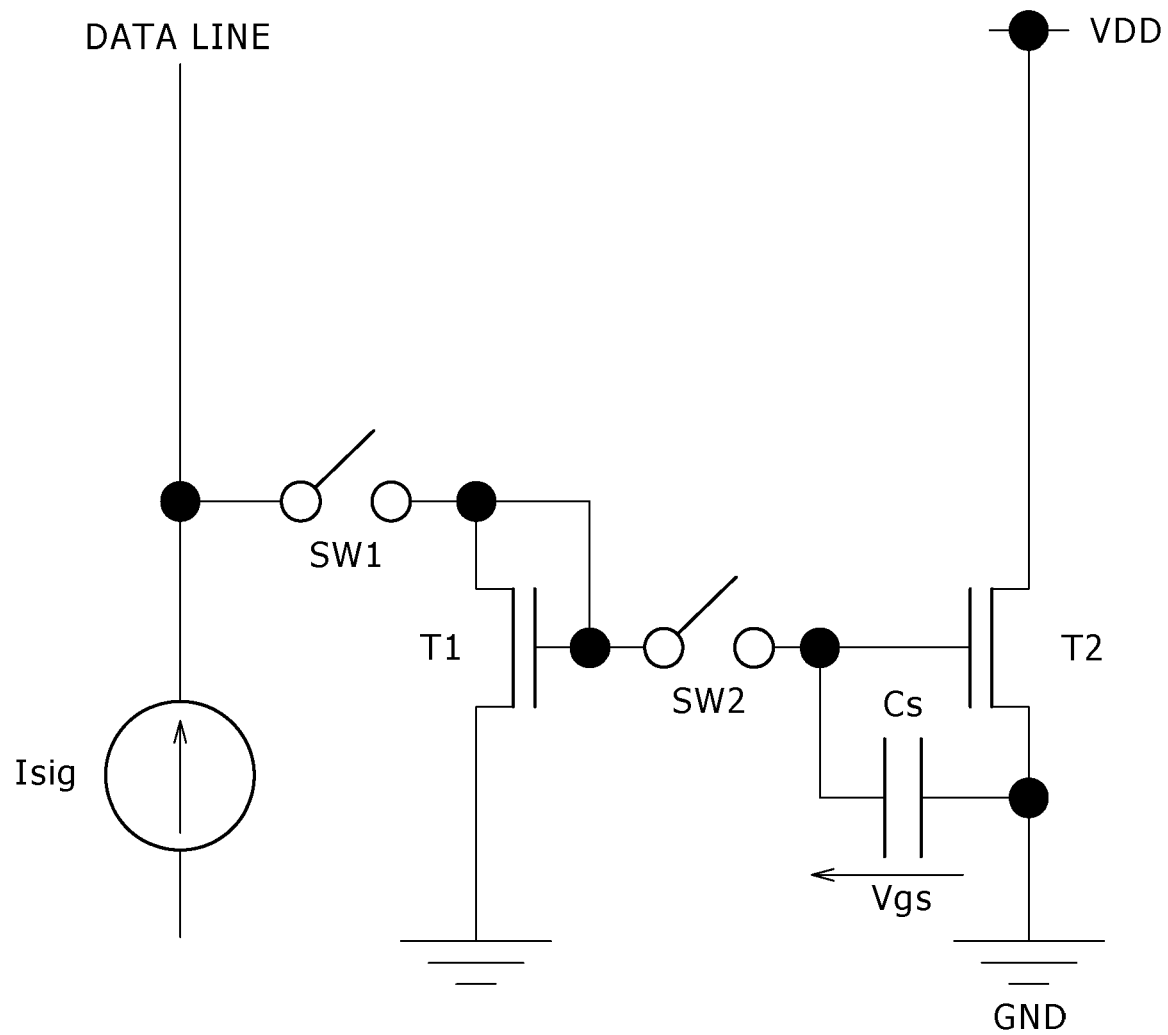
FIG. 13 is a circuit diagram showing yet another modification example of the circuit arrangement shown in FIG. 1.

FIG. 13 is a circuit diagram showing yet another modification example of the circuit arrangement of FIG. 1.

The circuit arrangement shown in FIG. 13 is different from that shown in FIG. 1 in that the transistor T1 for converting the signal current Isig to a voltage is provided separately from a transistor T2 through which a current for heat generation flows.

At the time of signal writing, the switches SW1 and SW2 are in the on-state, so that the signal current Isig flows through the transistor T1. At this time, the signal current Isig is represented by Equation (3).

$$I_{sig} = \mu \cdot C_{OX} \cdot \frac{W_1}{L} \cdot \frac{(V_{gs} - V_{th})^2}{2} \quad (3)$$

The meanings of the respective parameters in Equation (3) are basically the same as those of Equation (1). However, the channel width of the transistor T1 is represented as $W_1$ in Equation (3). At the time of driving, two switches SW1 and SW2 are in the off-state. In the capacitor Cs, the gate-source voltage Vgs generated due to the write operation is held. Therefore, the drive current Idrv that flows through the transistor T2 is represented by Equation (4).

$$I_{drv} = \mu \cdot C_{OX} \cdot \frac{W_2}{L} \cdot \frac{(V_{gs} - V_{th})^2}{2} \quad (4)$$

In Equation (4), the channel width of the transistor T2 is represented as $W_2$. The parameters μ, Cox, and Vth of the transistor T2 may be regarded as equal to those of the transistor T1 practically because the transistors T1 and T2 are formed in a small heating part. Furthermore, the transistors T1 and T2 can be so designed as to have the same channel length L. As a result, Equation (5) can be derived from Equations (3) and (4).

$$\frac{I_{drv}}{I_{sig}} = \frac{W_2}{W_1} \quad (5)$$

In general, the respective parameters included in the right sides of Equations (3) and (4) often vary from substrate to substrate, and from place to place even on the same substrate. However, Equation (5) shows that the ratio of the drive current Idrv to the signal current Isig is equal to the ratio of the channel width of the transistor T2 to that of the transistor T1 irrespective of the values of the parameters.

A feature of the circuit of FIG. 13 is that the ratio of the drive current Idrv to the signal current Isig can be adjusted to any value unlike the circuit of FIG. 1. For example, if slight heat generation is desired but it is difficult for an external circuit to generate a small current, the channel widths are so designed that the value of the right side of Equation (5) becomes small. Conversely, it is also easy that the channel widths are so designed that a large drive current Idrv can be obtained from a small signal current Isig.

As described above, the embodiment of the present application can provide a reaction device that can carry out heat control individually with high accuracy. This reaction device can be used for a wide variety of applications, as a device used for a reaction requiring precise heat control. Among the applications, the reaction device can be suitably used as e.g. a PCR device that performs a gene amplification reaction and so on. Examples in which the reaction device is used as a PCR device will be described below.

In a related-art PCR device, although temperature control of a thermal cycler is carried out, individual temperature control for each sample is difficult because the related-art PCR device is based on a gradient mechanism. Furthermore, the related-art PCR device can not individually carry out temperature control at the time of a gene amplification reaction. As a result, in the related-art PCR device, e.g. a problem that the gene amplification amounts of the respective samples can not be uniformed is remarkable.

By applying the reaction device according to an embodiment of the present application to such a PCR device, an improved PCR device that can solve the above-described problems and allows exhaustive analysis can be provided. The form of a PCR device according to an embodiment will be described below.

Figure 14:
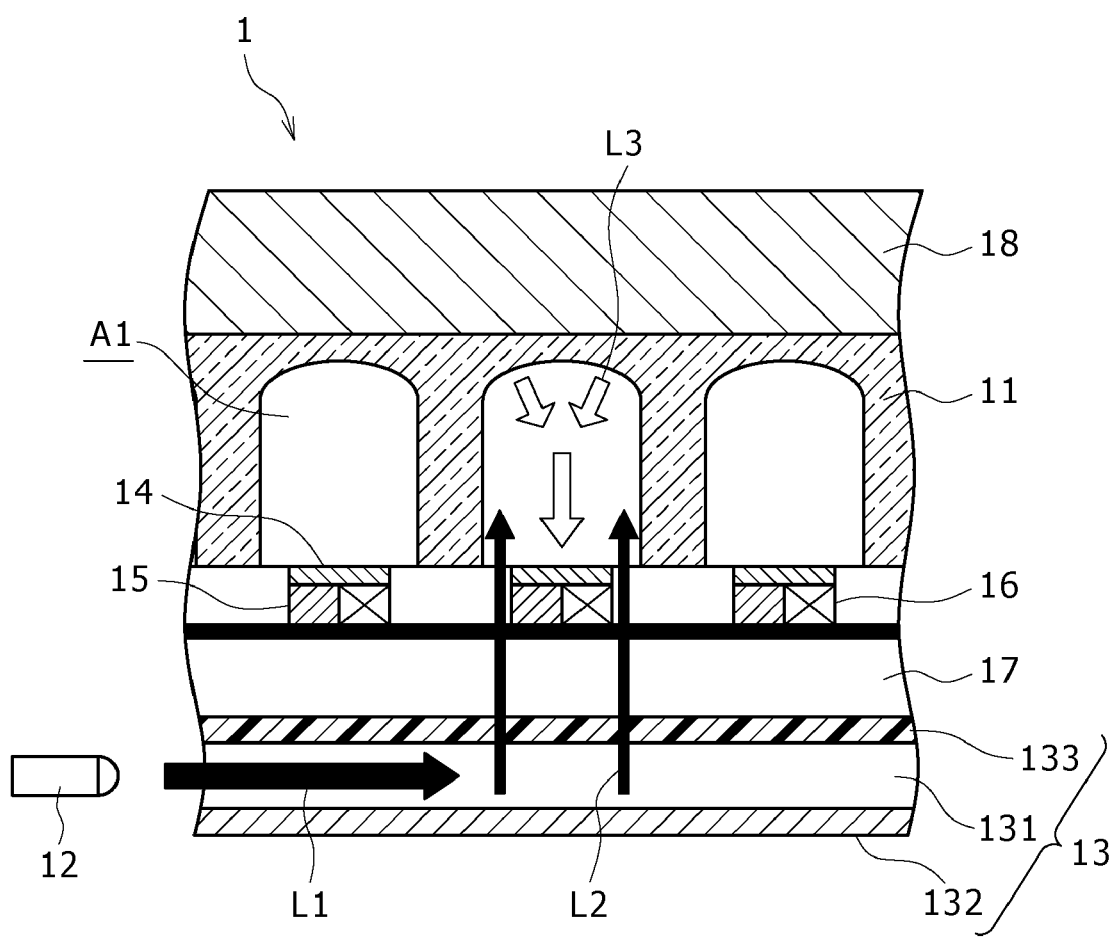
FIG. 14 is a conceptual sectional view of a first application example in which the reaction device according to the embodiment of the present application is used as a PCR device.

FIG. 14 is a conceptual sectional view of a first application example in which the reaction device according to an embodiment is used as a PCR device. In the drawings to be used for the following description, the device configuration and so forth is simply shown for convenience of description.

Numeral 1 in FIG. 14 denotes the PCR device according to an embodiment. The size and layer structure of this PCR device 1 can be optionally selected according to purpose, and the configuration of the PCR device 1 can also be designed or changed without departing from the scope of the present application.

The PCR device 1 includes a well substrate 11 having plural reaction areas A1, a light source 12, and an excitation-light scanning plate 13 for guiding excitation light beams L1 and L2 emitted from the light source 12. Filters 14, fluorescence detectors 15 for detecting fluorescence L3, and heating parts 16 for heating the reaction areas A1 are provided over a measurement substrate 17. It is obvious that any of the above-described circuit arrangements can be used for the heating parts 16.

In the PCR device 1, the excitation light beam L1 emitted from the light source 12 passes through the excitation-light scanning plate 13 so as to be applied to the respective reaction areas A1 as the excitation light beam L2. The fluorescence L3 emitted from the inside of the reaction area A1 is detected and measured by the fluorescence detector 15.

In particular, in the PCR device 1, the heating part 16 may be provided for each reaction area A1. Furthermore, a temperature detector that detects the temperature of the vicinity of the heat source of the heating part 16 and converts the detected temperature to an electric signal may be provided. In addition, a unit that determines the heating amount of the heat source based on the pre-obtained correlation between the electric signal and the heating amount may be provided. Due to this configuration, the temperatures of the respective reaction areas A1 can be individually controlled with high accuracy.

It is also possible to carry out higher-accuracy temperature control by employing the heating amount information obtained in consideration of the temperature information of the respective reaction areas A1. As a result, the gene expression dose can be analyzed with high accuracy. Details of the respective components of the PCR device 1 will be described below.

The well substrate 11 has the plural reaction areas (wells) A1. A predetermined reaction is performed in the reaction area A. For example, this well substrate 11 is formed of a low-fluorescence-emission plastic material or glass. In the well substrate 11, substantially the same number of reaction areas A1 as the number of genes of a human can be arranged in a matrix.

In the embodiment, it is desirable that the reaction area (well) A1 for a PCR reaction be a micro-space. For example, if one well has a size of 300 μm×300 μm×300 μm (a volume of about 30 nL) and about forty thousand wells are arranged in a PCR device, this device will have an area of about six centimeters square.

The shapes of the individual reaction areas A1 are not particularly limited, but any shape is available as long as the reaction areas A1 can hold a reaction solution therein. A suitable shape can be optionally selected in consideration of the optical path for emission and introduction of the excitation light beams L1 and L2, the optical path for detection of the fluorescence L3, and so forth. In the PCR device 1, the reaction areas A1 have a curved part so that the fluorescence L3 can be reflected in the reaction area A1.

In order to suppress the lowering of the detection sensitivity due to the influence of light scattering and external light, it is desirable that the reaction areas A1 be coated by a light-shielding material (e.g. diamond-like carbon).

In an embodiment, the light source 12 and the excitation-light scanning plate 13 for guiding the excitation light beam L1 to the respective reaction areas A1 can be used as an optical unit that allows all of the plural reaction areas A1 to be irradiated with excitation light having a specific wavelength.

The kind of the light source 12 is not particularly limited as long as the light source 12 can emit light of a specific wavelength. However, it is desirable to use a white or single-color light emitting diode (LED) as the light source 12. Using a light emitting diode allows easy acquisition of light free from unnecessary ultraviolet and infrared rays.

In an embodiment, there is no particular limitation on the place of the light source 12 and the number of light sources. Although not shown in a drawing, plural light sources 12 may be so provided as to face the respective reaction areas A1 and each light source 12 may emit excitation light directly toward the corresponding reaction area A1. In this configuration, each reaction area A1 can be directly irradiated with excitation light by the light source 12. Thus, a larger amount of excitation light can be obtained. Furthermore, the light amounts of the excitation light beams L1 and L2 can be individually controlled, and thus the respective reaction areas A1 can be uniformly irradiated with the excitation light beams L1 and L2.

The excitation-light scanning plate 13 guides the excitation light beam L1 emitted from the light source 12 to the respective reaction areas A1 in the well substrate 11. The excitation light beam L1 emitted from the light source 12 is introduced into the spacer 131 inside the excitation-light scanning plate 13. A reflective film 132 is provided at the bottom of the excitation-light scanning plate 13, and can introduce the excitation light beam L2 into the well substrate 11. Due to this structure, a fluorescent substance in the reaction liquid in the respective reaction areas A1 can be excited with a uniform light amount. There is no particular limitation on the material and so on of the reflective film 132. However, it is desirable to use a dichroic mirror as the reflective film 132.

Furthermore, in an embodiment, it is desirable to provide over the excitation-light scanning plate 13 a filter 133 that allows the passage of only a light beam having the same wavelength as that of the excitation light beams L1 and L2. Due to the filter 133, the excitation light beam L2 can be efficiently extracted from the light emitted by the light source 12 and be guided to the reaction areas A1. As this filter 133, e.g. a polarizing filter can be used.

The excitation light beam L2 guided to the reaction area A1 is applied to a fluorescent substance or the like of probes in the reaction liquid in the reaction area A1. This generates the fluorescence L3. This fluorescence L3 is reflected by the wall surface of the reaction area A1 so as to be detected and measured by the fluorescence detector 15 provided below the reaction area A1.

In an embodiment, the filter 14 can be disposed between the reaction area A1 and the fluorescence detector 15 so that light of a specific wavelength can be extracted. The material of the filter 14 is not limited as long as light of a specific wavelength (e.g. fluorescence L3) can be extracted therethrough. For example, a dichroic mirror can be used as the filter 14.

The fluorescence detector 15 detects and measures fluorescence that is emitted due to excitation of a fluorescent dye intercalated in probes in response to the excitation light beam L2 guided to the reaction area A1.

In the PCR device 1, the heating part 16 is provided for each reaction area A1. The heating part 16 includes a temperature control mechanism, which allows the heating part 16 to carry out temperature control of the reaction area A1. Due to this configuration, e.g. in the case of carrying out a PCR cycle, higher-accuracy temperature control can be carried out for the steps of "thermal denaturation annealing extension reaction".

Figure 15:
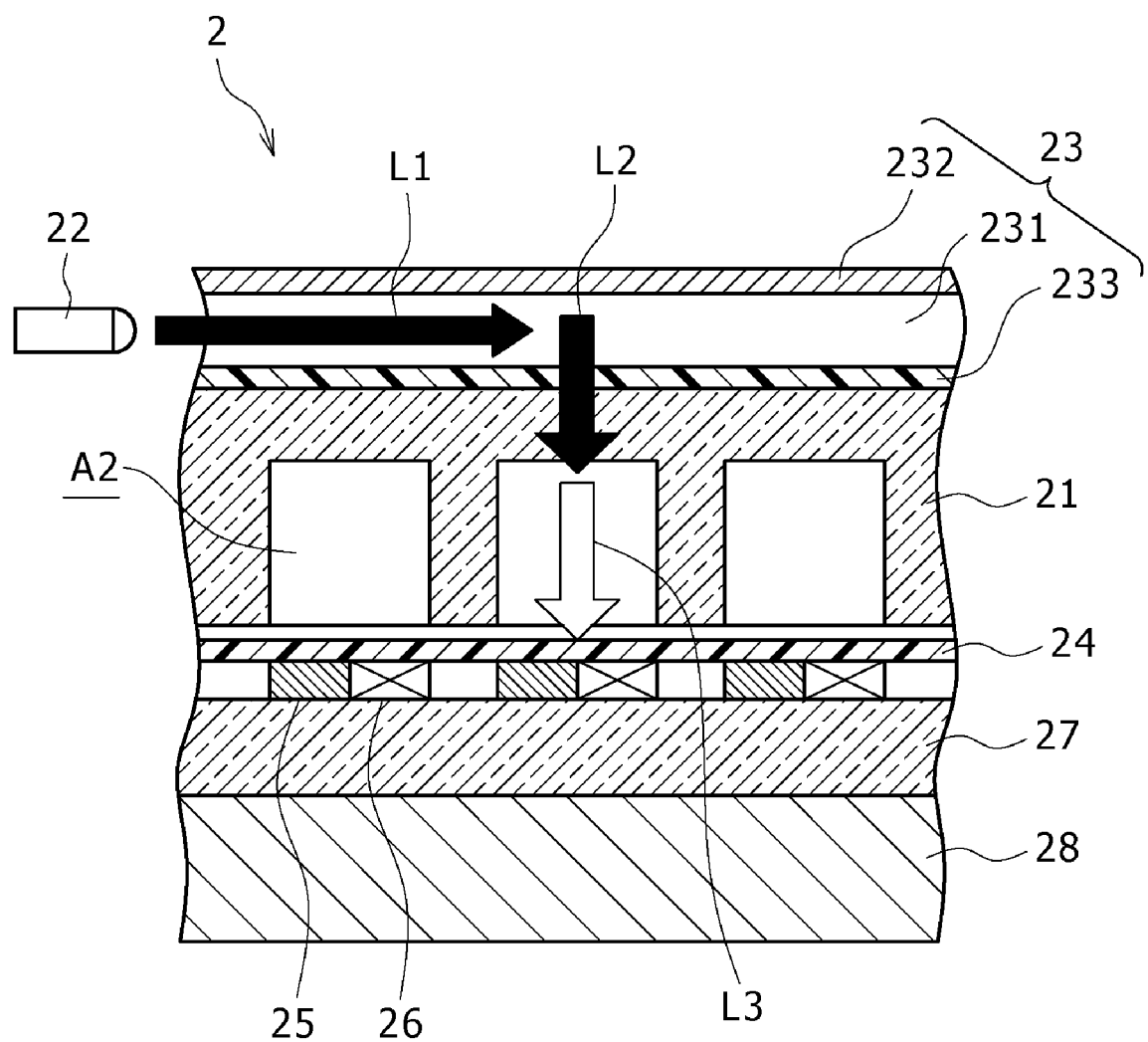
FIG. 15 is a conceptual sectional view of a second application example in which the reaction device according to the embodiment of the present application is used as a PCR device.

FIG. 15 is a conceptual sectional view of a second application example in which the reaction device according to the embodiment is used as a PCR device. In the following, differences from the configuration shown in FIG. 14 are mainly described, and the description of the same parts is omitted.

This PCR device 2 is the same as the PCR device 1 of FIG. 14 in that a fluorescence detector 25 and a heating part 26 are provided over a measurement substrate 27 for each reaction area (well) A2. However, the PCR device 2 is different from the PCR device 1 in that the excitation light beam L2 is guided through the upper part of a well substrate 21 and the fluorescence L3 that has passed through the reaction area A2 is detected.

In the PCR device 2, the excitation light beam L1 emitted from a light source 22 is guided to the reaction area A2 by an excitation-light scanning plate 23. The excitation light beam L1 passes through a spacer 231 in the excitation-light scanning plate 23, so that the excitation light beam L2 is guided to the well substrate 21 by a reflective film 232 and a filter 233.

The excitation light beam L2 is applied to a fluorescent substance or the like of probes in the reaction liquid in the reaction area A2. This generates the fluorescence L3. This fluorescence L3 is detected and measured by the fluorescence detector 25 provided below the reaction area A2.

Temperature control is carried out by the heating part 26 provided below the reaction area A2, and temperature control such as a heating cycle can be carried out by a Peltier element 28 and so on.

In a typical PCR device, the cycle of "thermal denaturation annealing extension reaction" is carried out about thirty times, and the thirty cycles take a reaction time of 25 to 30 minutes. In the cycles, temperature control with a temperature change rate of about 2° C./second is carried out. In contrast, in the PCR device according to the embodiment, temperature control with a temperature change rate of about 20° C. or higher/second is possible. Thus, the time shortening by about 40 seconds per one cycle is possible, and thus a reaction time shorter than 25 minutes can be achieved for the whole of the thirty cycles.

Furthermore, the annealing time and the extension reaction time can be controlled depending on the design of primers, and thus the amplification factor can be uniformed to a constant multiplication factor (e.g. twice). Consequently, the accuracy of detection of the gene expression dose can be enhanced.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A reaction device comprising:
  a plurality of reaction areas; and
  a plurality of heating parts, each reaction area including a different one of the heating parts, wherein
  each of the heating parts includes
    a heat source,
    a scan line for selecting the heating part,
    a data line that transmits heating amount information used for heating to the heat source,
    a converter that converts the heating amount information to a voltage level, the converter including a first field effect transistor whose gate and drain are electrically connected to each other, a second field effect transistor whose gate and drain are electrically connected to each other, the source of the first field effect transistor and the drain of the second field effect transistor being electrically connected to each other, and the source of the second field effect transistor being electronically connected to a ground potential, a holder that stores the heating amount information also after the scan line is turned to a non-selected state, and a heat generation controller that controls heat generation of the heat source based on the heating amount information.

2. The reaction device according to claim 1, wherein
the heating amount information transmitted from the data line is a signal current,
the holder holds the heating amount information as the voltage level, and
the heat generation controller converts the held voltage level to a current level to thereby control heat generation.

3. The reaction device according to claim 1, wherein
the reaction device is a PCR device that performs a gene amplification reaction in the reaction areas.

4. The reaction device according to claim 3, further comprising:

an optical unit configured to irradiate the reaction areas with excitation light including a predetermined wavelength; and a fluorescence detector configured to detect fluorescence generated due to irradiation of the excitation light.

* * * * *